United States Patent
Myers et al.

(10) Patent No.: US 9,454,740 B2
(45) Date of Patent: *Sep. 27, 2016

(54) APPARATUS, METHODS, AND COMPUTER PROGRAM PRODUCTS FOR MONITORING NETWORK ACTIVITY FOR CHILD RELATED RISKS

(75) Inventors: Jerome Myers, Villa Rica, GA (US); John Ruckart, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 622 days.

This patent is subject to a terminal disclaimer.

(21) Appl. No.: 13/494,437

(22) Filed: Jun. 12, 2012
(Under 37 CFR 1.47)

(65) Prior Publication Data

US 2012/0254422 A1 Oct. 4, 2012

Related U.S. Application Data

(63) Continuation of application No. 11/855,369, filed on Sep. 14, 2007, now Pat. No. 8,296,843.

(51) Int. Cl.
*G06F 7/04* (2006.01)
*G06Q 10/06* (2012.01)
*H04L 29/06* (2006.01)

(52) U.S. Cl.
CPC ........... *G06Q 10/06* (2013.01); *H04L 63/1416* (2013.01)

(58) Field of Classification Search
CPC ........ H04L 63/30; H04L 63/10; G06F 21/50
USPC ................ 709/225, 206, 224; 726/4, 9, 22
See application file for complete search history.

(56) References Cited

U.S. PATENT DOCUMENTS

| | | |
|---|---|---|
| 6,236,365 B1 | 5/2001 | LeBlanc et al. |
| 6,265,974 B1 | 7/2001 | D'Angelo et al. |
| 6,298,374 B1 | 10/2001 | Sasaki et al. |
| 6,486,992 B1 | 11/2002 | Sasaki et al. |
| 6,859,881 B2 * | 2/2005 | Lortz ............... A63F 13/12 715/736 |
| 7,046,139 B2 * | 5/2006 | Kuhn ............... H04N 7/163 340/3.1 |
| 7,046,153 B2 | 5/2006 | Oja et al. |
| 7,194,536 B2 | 3/2007 | Fellenstein et al. |
| 7,269,154 B2 | 9/2007 | Hosoda et al. |
| 7,302,488 B2 | 11/2007 | Mathew et al. |
| 7,389,346 B2 | 6/2008 | Reasor et al. |
| 7,406,715 B2 | 7/2008 | Clapper |
| 7,594,019 B2 | 9/2009 | Clapper |
| 7,640,336 B1 | 12/2009 | Lu et al. |
| 7,664,083 B1 | 2/2010 | Cermak et al. |
| 7,975,299 B1 * | 7/2011 | Balducci et al. ............ 726/22 |
| 8,056,118 B2 * | 11/2011 | Piliouras ............ G06F 21/41 709/217 |
| 8,095,672 B1 * | 1/2012 | Newstadt ............ G06F 21/40 705/75 |

(Continued)

FOREIGN PATENT DOCUMENTS

EP 1 975 895 A1 10/2008
WO WO 2007/138816 A1 12/2007

*Primary Examiner* — Dede Zecher
*Assistant Examiner* — Viral Lakhia
(74) *Attorney, Agent, or Firm* — Scott P. Zimmerman, PLLC

(57) ABSTRACT

Embodiments of the present invention provide apparatus, method and/or computer program products for monitoring internet activity. In some method embodiments, a network is searched to detect network data indicative of actual and/or potential contact with a child. A report is generated that identifies a source of detected data and the report is sent to a responsible party.

19 Claims, 5 Drawing Sheets

(56) References Cited

U.S. PATENT DOCUMENTS

| | | | |
|---|---|---|---|
| 8,099,668 B2* | 1/2012 | Garbow | A63F 13/12 705/319 |
| 8,115,625 B2 | 2/2012 | Yoshioka et al. | |
| 8,510,388 B2* | 8/2013 | Taylor | H04L 51/04 709/206 |
| 8,782,217 B1* | 7/2014 | Arone | H04W 12/08 709/224 |
| 2002/0175820 A1 | 11/2002 | Oja et al. | |
| 2002/0184496 A1 | 12/2002 | Mitchell et al. | |
| 2003/0036391 A1 | 2/2003 | Jordan | |
| 2003/0163731 A1 | 8/2003 | Wigley et al. | |
| 2003/0182420 A1 | 9/2003 | Jones et al. | |
| 2003/0214411 A1 | 11/2003 | Walter et al. | |
| 2004/0003071 A1 | 1/2004 | Mathew et al. | |
| 2004/0006621 A1 | 1/2004 | Bellinson et al. | |
| 2004/0044628 A1* | 3/2004 | Mathew et al. | 705/51 |
| 2004/0044911 A1 | 3/2004 | Takada et al. | |
| 2004/0073634 A1 | 4/2004 | Haghpassand | |
| 2004/0105417 A1 | 6/2004 | Hosoda et al. | |
| 2004/0111479 A1* | 6/2004 | Borden | G06Q 10/107 709/206 |
| 2004/0155775 A1 | 8/2004 | Kaneko | |
| 2004/0205175 A1 | 10/2004 | Kammerer | |
| 2004/0239508 A1 | 12/2004 | Kaneko | |
| 2005/0086255 A1* | 4/2005 | Schran | G06F 11/34 |
| 2005/0157863 A1 | 7/2005 | Sizemore, Jr. | |
| 2005/0174242 A1* | 8/2005 | Cohen | G08B 25/016 340/573.4 |
| 2005/0286705 A1 | 12/2005 | Contolini et al. | |
| 2006/0045082 A1 | 3/2006 | Fertell et al. | |
| 2006/0095556 A1 | 5/2006 | Arnold et al. | |
| 2006/0206941 A1 | 9/2006 | Collins | |
| 2007/0174900 A1* | 7/2007 | Marueli | G06F 21/606 726/4 |
| 2007/0202870 A1* | 8/2007 | Bian | H04M 3/2218 455/428 |
| 2007/0250863 A1 | 10/2007 | Ferguson | |
| 2008/0004748 A1 | 1/2008 | Butler et al. | |
| 2008/0005325 A1* | 1/2008 | Wynn et al. | 709/225 |
| 2008/0059198 A1 | 3/2008 | Maislos et al. | |
| 2008/0120693 A1 | 5/2008 | Beilinson et al. | |
| 2008/0162692 A1 | 7/2008 | Schultz et al. | |
| 2008/0168095 A1 | 7/2008 | Larcombe et al. | |
| 2008/0168548 A1* | 7/2008 | O'Brien | 726/9 |
| 2008/0207218 A1* | 8/2008 | Craine | B06R 25/1004 455/456.1 |
| 2009/0183254 A1 | 7/2009 | Franco et al. | |
| 2009/0306793 A1 | 12/2009 | Takebayashi et al. | |
| 2010/0225469 A1 | 9/2010 | Yoshioka et al. | |
| 2013/0268669 A1* | 10/2013 | Tessman et al. | 709/225 |

\* cited by examiner

| Network Activity Report Contents ||||
|---|---|---|---|
| Source of detected data 410 | Communications of child | Internet ||
| ^ | ^ | Mobile electronics ||
| ^ | Network posting | Third party ||
| Data 420 | Network address |||
| ^ | Personal data | Name ||
| ^ | ^ | Age ||
| ^ | ^ | Contact information ||
| ^ | ^ | Identification number ||
| ^ | ^ | Alias ||
| ^ | ^ | Family information ||
| ^ | Call log | Telephone number ||
| ^ | ^ | Duration of call ||
| ^ | Location log | Geographical locations ||
| ^ | ^ | Off limits ||
| ^ | ^ | Disabled periods ||
| Date/time of data posting 430 ||||

400

FIG. 5

APPARATUS, METHODS, AND COMPUTER PROGRAM PRODUCTS FOR MONITORING NETWORK ACTIVITY FOR CHILD RELATED RISKS

CROSS-REFERENCE TO RELATED PATENT APPLICATION

This application is a continuation application of U.S. patent application Ser. No. 11/855,369 filed Sep. 14, 2007 and since issued as U.S. Pat. No. 8,296,843, and incorporated herein by reference in its entirety.

FIELD OF THE INVENTION

This invention relates to network monitoring apparatus, methods, and computer program products and, more particularly, to apparatus, methods and computer program products for monitoring network activity for child related risks.

BACKGROUND OF THE INVENTION

The evolution of networks, such as the internet, cellular, wireless, broadband, and other communication technologies, has led to an explosion in the variety of ways that children can be placed at risk. For example, on-line predators, such as pedophiles and other would-be abusers, often use the internet to gather information from and about children. Access to this information by unscrupulous people places the children at risk of exploitation and/or abuse. In many circumstances, the child voluntarily posts personal information that can be used to further the goal of exploitation. Further, children can be contacted and/or encouraged to contact potential miscreants using cellular telephones or other mobile communication devices. Because child predators frequently instruct the child not to inform their parents, the child may use a cellular telephone to make calls to or receive calls from an individual that that may present a risk to a child.

As the communications networks become more pervasive, the access to these networks becomes more commonplace, and thus, more available to children. In this regard, parents are faced with additional challenges in managing the risks that children are subjected to through and with the networks. The monitoring task may be complicated in the circumstance where a parent lacks the technological sophistication to personally manage, monitor, and/or limit the network access points.

SUMMARY OF THE INVENTION

Embodiments of the present invention provide apparatus, method and/or computer program products for monitoring internet activity. In some method embodiments, a network is searched to detect network data indicative of actual and/or potential contact with a child. A report is generated that identifies a source of detected data and the report is sent to a responsible party.

Generating the report may include generating a baseline report that includes network addresses corresponding to previous postings of the detected data and/or an update report that includes network addresses of data detected following a generation of a previous report. Generating the report can include comparing a source of detected data with an approved list of contacts and generating a report that identifies an unapproved contact that is not included on the approved list of contacts.

In some embodiments, searching can comprise monitoring the network at regular time intervals to detect recent network postings of detected data. A report of network addresses and dates of recent network postings of detected data can also be generated. The detected data can include a name, an age, contact information, an identification number, and/or an alias. In some embodiments, instructions that are in response to the report and are configured to reduce network related risk to a child can be received from the responsible party.

Further embodiments can include monitoring communications of the child to detect data inclusive of private information corresponding to the child and/or the child's family. Monitoring communications of the child can be used to determine an identity of a correspondent. The identity can be compared to a list of approved correspondents to determine if the correspondent is approved and an alert report can be generated if the correspondent is not approved. The communications can be internet-based and/or mobile electronic device communications. The report can include a communications log configured to contain data corresponding to communications sent from and received by the device in the case of mobile electronic device communications. In some embodiments, a report based on mobile electronic device communications can be a location log corresponding to geographic locations of the device during a specified time interval.

In still further embodiments, a recent posting of detected data relating to a child can be compared to a previous report of detected data and an update report can be generated that corresponds to recently detected data. Communications of the child can be monitored and a report corresponding to the communications can be generated such that the communications with a correspondent can be evaluated. The communications to be included in the report can be determined by comparing the identity of the correspondent to a list of approved correspondents.

BRIEF DESCRIPTION OF THE DRAWINGS

FIG. 5 illustrates a network activity report according to some embodiments of the present invention.

DETAILED DESCRIPTION

Figure 1:
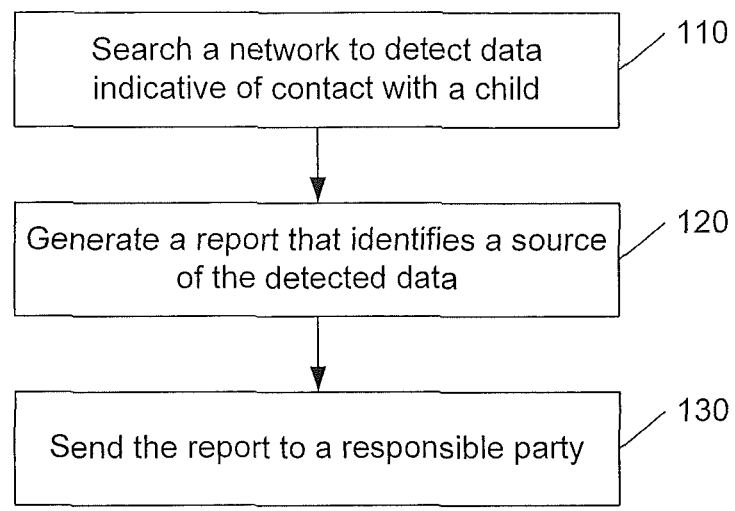
FIG. 1 is a flowchart illustrating operations for monitoring network activity according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Some embodiments of the present invention may arise from recognition that it may be desirable to monitor network activity for information or content that may pose a risk to children. In particular, personal data relating to a child or contact information regarding persons contacting and/or contacted by the child may be of particular interest to a responsible party such as a parent or guardian. In embodiments of the present invention, responsive to detection of network activity relating to a child, a report is generated and sent to a responsible party. As used herein, a "network device" may comprise any device or group of devices configured to send, receive, process, and/or store data that can be accessed by more than one person. Examples of network devices include, but are not limited to, computers, telephones, and mobile electronic devices, such as cellular telephones and PDA's, among others.

FIG. 1 illustrates operations for monitoring network activity according to some embodiments of the present invention. The operations begin with searching a network to detect data indicative of actual and/or potential contact with a child (block 110). A network can be, for example, a cellular telephone network and/or the internet. For example, the network can include websites and web-based communities such as Myspace.com, blogs, and/or text messaging services and/or devices such as Instant Messaging (IM) and Short Message Service (SMS) capable devices. In some embodiments, the detected data can include a child's personal data, contact information, identification numbers and/or information regarding family and/or friends.

A report is generated that identifies a source of the detected data (block 120). The report can include network addresses or identifiers corresponding to postings or other occurrences of detected data. The report can also include data corresponding to communications made by or to the child. Additionally, the report can include data relating to geographical locations that the child has frequented including dates and times of the visits.

The report is then sent to a responsible party (block 130), such as, for example, a parent, guardian, and/or caretaker. By receiving a report of data that is detected in a network search, a parent, for example, can determine and possibly reduce the risks to a child based on the network activity or information. For example, a parent receiving a report that includes the network address, telephone number, and/or identity of a potential online predator may be able to curtail or prevent future contact between the child and the potential predator, thus reducing the risk to the child. Similarly, by receiving a report that includes location information that a parent was previously unaware of, the parent can determine if a child has been frequenting unsafe and/or otherwise off-limits locations.

Figure 2:
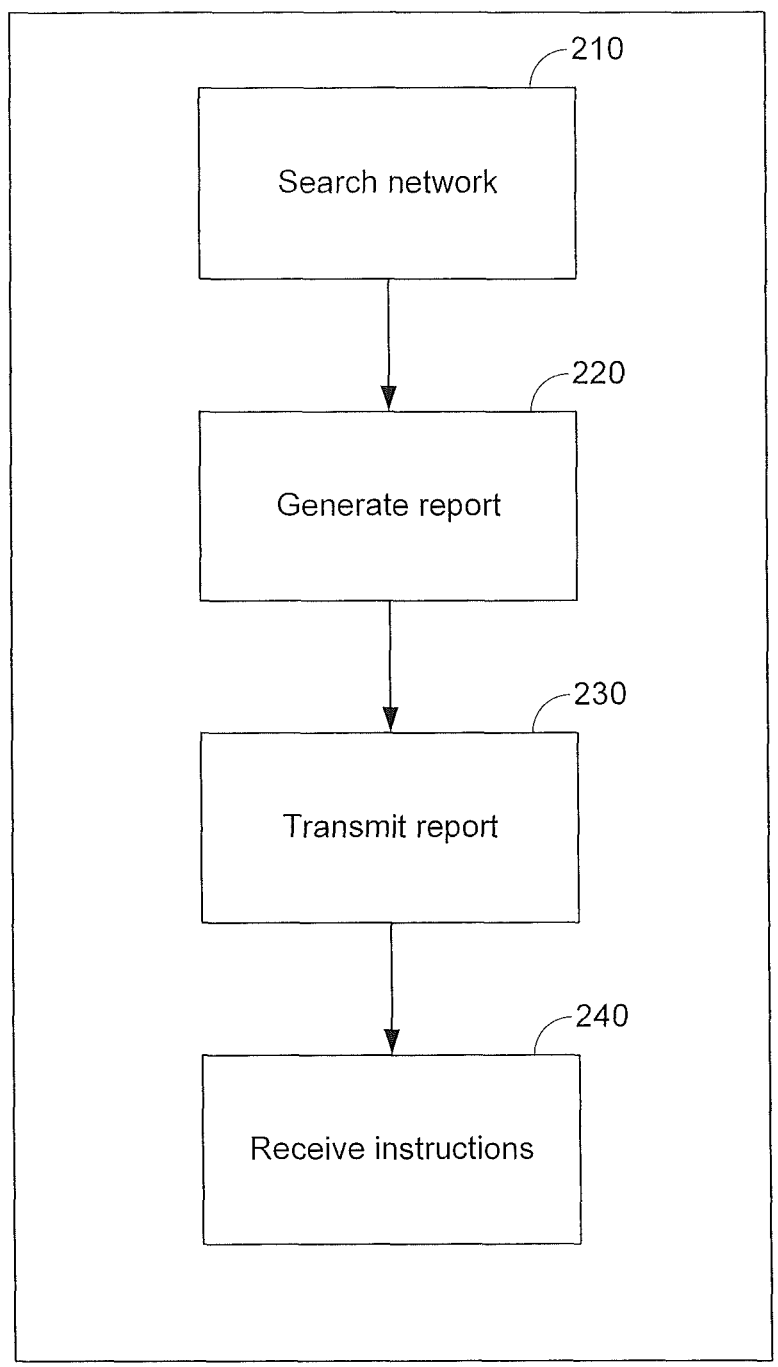
FIG. 2 is a block diagram illustrating a network activity monitoring apparatus, methods and/or computer program products according to some embodiments of the present invention.

FIG. 2 illustrates an apparatus, method and/or computer program product and the operations thereof for monitoring network activity according to some embodiments of the present invention. A network is searched (block 210) to detect network data that is indicative of actual and/or potential contact with a child. Data detected by the search can include internet postings of related to the child, such as name, address, telephone number, alias or nickname, age, and/or identification numbers. Examples of identification numbers can include social security number, student identification number, credit card number, and online account numbers, among others. Other information relating to the child can also be detected, such as that relating to family and/or friends. Additionally, communications by or with a child, such as cellular telephone, email, instant messaging, web logs, can be monitored to detect data that is inclusive of private information corresponding to the child and/or other indications of potential risk.

A report is generated (block 220) that identifies a source of network data detected in the search. The source of network data can be, for example, a network address of an internet posting that is indicative of contact or potential contact with the child. The source of network data can also be an email address, a web log identifier, and/or an instant messaging address, alias, or identifier. The report can also, in the case of cellular communications, be a call log that can include telephone numbers that called the child or were called by the child. Further, the report can be a location log that can include geographical location information generated by a mobile electronic device that is equipped with, for example, a positioning system receiver, such as a Global Positioning System (GPS) receiver.

The report is transmitted (block 230) to a responsible party, such as a parent or guardian of the child. The report can be transmitted using a variety of media including, but not limited to, paper, magnetic, optical, or electronic storage media. Additionally, the report can be transmitted electronically using wired and/or wireless communication techniques. Based on the content of the report, instructions can be received (block 240) from the responsible party. The instructions can be configured to reduce network related risks to a child and can include, for example, requests to control a child's access to specific network addresses or contacts. For example, a contact can be added to a "buddy" list of approved contacts. Also, the instructions can include requests for additional information or scrutiny regarding the reported information. For example, a new contact can be blocked and further investigated before the child is permitted to further communicate with the contact. In the case where the report includes geographical information, the instructions may request an alert notification anytime the child returns to a particular location. The report can also request notification if a child leaves a particular location during a specified time. For example, a parent may want notification if the child leaves school during the time the child is scheduled to be in school.

Figure 3:
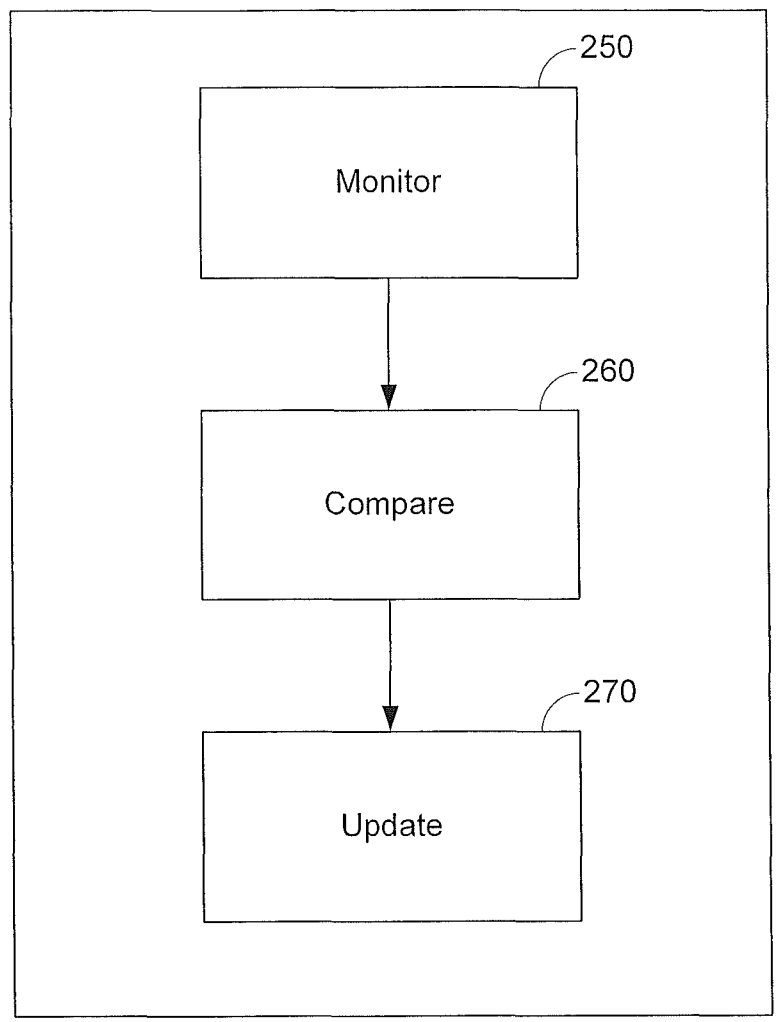
FIG. 3 is a block diagram illustrating report generating apparatus, methods and/or computer program products according to some embodiments of the present invention.

FIG. 3 illustrates an apparatus, method and/or computer program product and the operations thereof for generating a report according to some embodiments of the present invention. Networks can be monitored (block 250) at predetermined intervals to provide current data regarding network activity that is indicative of actual and/or potential contact with a child. The results from the regular monitoring can be compared (block 260) to previously detected data. The comparison can be configured to determine new contacts or communications since the most recent network search was performed. The comparison can also be configured to compare contacts, network addresses, phone number, and/or geographical locations to a list of those previously approved and/or disapproved. Based on the comparison, the report can be updated (block 270) to include current, new, and/or previously unapproved detected data. For example, a baseline report can be generated the first time a network is searched and an update report can be generated for each subsequent search of the network. The update report can be configured to include detected data that has occurred since the baseline or a more recent update report was generated.

Figure 4:
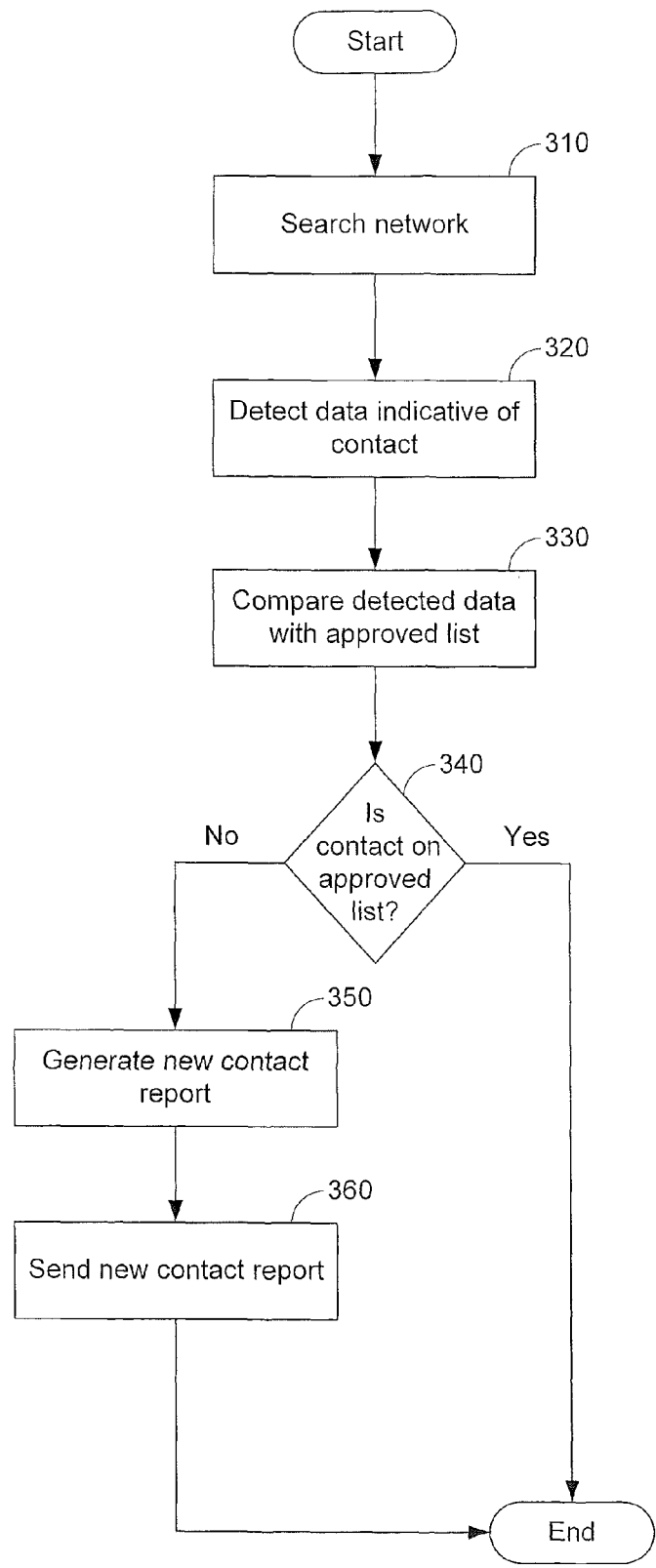
FIG. 4 is a flow diagram illustrating operations for updating a network activity report according to some embodiments of the present invention.

FIG. 4 is a flow diagram illustrating operations for updating a network activity report according to some embodiments of the present invention. A network is searched (block 310) and data indicative of potential and/or actual contact with a child is detected (block 320). The detected data is compared to an approved list (block 330) to determine if the contact and/or correspondent is on the approved list (block 340). If the contact is not on the approved list, then a new contact report is generated (block 350) and the report is sent (block 360) to a responsible party. If the contact is on the approved list, then a report regarding that contact is not generated. In this manner, the responsible party receives reports in the circumstance where the child has contact with persons not already evaluated for risk to the child.

FIG. 5 illustrates a network activity report 400 according to some embodiments of the present invention. The report can include, for example, a source of detected data (block 410), data (block 420) and a date and/or time of data posting (block 430). The source of selected data 410 can include data relating to communications with and/or by the child, such as on the internet and/or through a mobile electronic device. The source of selected data 410 can also include network posting that is made by a third party, such as a friend, family member, and/or online predator.

The data 420 can be personal data, such as name, age, contact information, identification number, alias, and/or information regarding friends and/or family. The data 420 can also include a call log that can include, for example, a telephone number and/or duration of call. Similarly, the data 420 can also include a location log that includes a list of geographical locations where, for example, a child spends more than a specified amount of time. The location log may also include a listing of times when a child visits a place that is designated off-limits by the parent or other responsible party. The data 420 can further include a network address that corresponds to the location of a specific posting and/or a point of origination for a posting. The date and/or time that data 420 is posted and/or a communication is made can be included and can be useful to determine whether detected data has already been scrutinized and/or investigated. A network activity report 400 under the invention disclosed herein can include any combination of the contents described above and can be used by a parent or other responsible party to reduce potential risks to a child associated with information on one or more networks.

What is claimed is:

1. A method, comprising:
   detecting, by a computer, Internet postings associated with a network address and a child's age in years;
   retrieving, by the computer, an electronic communications log associated with the network address, the electronic communications log logging electronic communications previously sent and received, the electronic communications all associated with the network address and with different correspondent addresses;
   retrieving, by the computer, an electronic locations log associated with the network address, the electronic locations log logging times at geographical locations associated with the network address;
   generating, by the computer, an electronic report that identifies the different correspondent addresses logged in the electronic communications log and a list of the geographical locations logged in the electronic locations log that exceed a specified amount of time;
   retrieving, by the computer, a parental network address associated with a parent of the child;
   sending, by the computer, the electronic report to the parental network address; and
   receiving, by the computer, in response to the electronic report, instructions comprising a location and a notification request, the notification request requesting an electronic notification be sent to the parental network address in response to a current location associated with the network address differing from the location.

2. The method of claim 1, wherein the electronic report comprises a baseline report that includes the different correspondent addresses and an updated report that includes the correspondent addresses logged after the baseline report.

3. The method of claim 1, further comprising:
   comparing the different correspondent addresses logged in the electronic communications log to entries in an approved list of contacts; and
   reporting an unapproved contact not included in the approved list of contacts.

4. The method of claim 1, further comprising monitoring the electronic communications log at regular time intervals.

5. The method of claim 1, further comprising retrieving a name and contact information associated with the parental network address.

6. The method of claim 1, further comprising monitoring network communications associated with the network address.

7. The method of claim 1, further comprising logging short message service (SMS) messages in the electronic communications log.

8. The method of claim 1, further comprising logging calls in the electronic communications log.

9. The method of claim 1, further comprising logging website addresses in the electronic communications log.

10. The method of claim 1, further comprising logging the electronic communications in the electronic communications log.

11. The method of claim 1, further comprising searching the electronic communications log for a credit card number associated with the network address.

12. A system, comprising:
    a processor; and
    a memory device, the memory device storing instructions, the instructions when executed causing the processor to perform operations comprising:
    detecting Internet postings associated with a network address and a child's age in years;
    retrieving an electronic communications log associated with the network address, the electronic communications log logging electronic communications previously sent and received and associated with the network address and with correspondent addresses;
    retrieving an electronic locations log associated with the network address, the electronic locations log logging times at geographical locations associated with the network address;
    generating an electronic report that identifies the correspondent addresses logged in the electronic communications log and a list of the geographical locations logged in the electronic locations log that exceed a specified amount of time;
    retrieving a parental network address associated with a parent of the child;
    sending the electronic report to the parental network address; and
    receiving, in response to the electronic report, instructions specifying comprising a location and a notification request, the notification request requesting an electronic notification be sent to the parental network address in response to a current location associated with the network address differing from leaving the location specified by the instructions.

13. The system of claim 12, wherein the operations further comprise logging short message service (SMS) messages in the electronic communications log.

14. The system of claim 12, wherein the operations further comprise logging calls in the electronic communications log.

15. The system of claim 12, wherein the operations further comprise logging website addresses in the electronic communications log.

16. The system of claim 12, wherein the operations further comprise logging the electronic communications in the electronic communications log.

17. A memory device storing instructions that when executed cause a processor to perform operations, the operations comprising:
    detecting Internet postings associated with a network address and a child's age in years;
    retrieving an electronic communications log associated with the network address, the electronic communications log logging electronic communications previously sent and received by a device associated with the network address, the electronic communications log also logging correspondent addresses;
    retrieving an electronic locations log associated with the network address, the electronic locations log logging times at geographical locations associated with the network address;
    generating an electronic report that identifies the correspondent addresses logged in the electronic communications log and a list of the geographical locations logged in the electronic locations log that exceed a specified amount of time;

retrieving a parental network address associated with a parent of the child;

sending the electronic report to the parental network address; and receiving, in response to the electronic report, instructions comprising a location and a notification request, the notification request requesting that an electronic notification be sent to the parental network address in response to a current location associated with the network address differing from the location.

18. The memory device of claim 17, wherein the operations further comprise logging short message service (SMS) messages in the electronic communications log.

19. The memory device of claim 17, wherein the operations further comprise logging calls in the electronic communications log.

* * * * *